United States Patent Office 3,284,534
Patented Nov. 8, 1966

3,284,534
PROCESS FOR PREPARATION OF CONJUGATED DIOLEFINES
Akio Mitsutani, Obayashi, Takarazuka, and Yoshio Hamamoto, Kita-Kanbara-gun, Japan, assignors to Kurashiki Rayon Co., Ltd., Sakazu, Kurashiki, Japan
No Drawing. Filed Oct. 13, 1965, Ser. No. 495,702
Claims priority, application Japan, Nov. 13, 1964, 39/63,816
4 Claims. (Cl. 260—681)

The present invention relates to a method of preparing conjugated diolefines by catalytic decomposition of mono- or dialkyl-metadioxane.

It has been well known that the solid phosphoric acid catalyst which is obtained by depositing orthophosphoric or pyrophosphoric acid on a carrier consisting essentially of silica and then calcining the mass at a temperature below 600° C., is effective as catalyst for dehydration of alcohols and for polymerization of lower olefines. But it has been known that when such a catalyst is used for catalytic decomposition of alkylated metadioxane, the catalyst is active in polymerization of olefine, so that it causes secondary polymerization of the conjugated diolefines to decrease the selectivity for the formation of conjugated diolefines and the activity of the catalyst.

It also has already been known that the active species on the surface of the catalyst effective to such polymerization are orthophosphoric and pyrophosphoric acids, so that it is assumed that the presence of orthophosphoric acid and of pyrophosphoric acid on the surface of the catalyst will cause, in the catalytic decomposition of metadioxane, decrease of the selectivity and rapid decrease of the activity. The object of the invention is to provide a method of preparing conjugated diolefines at a good yield by using a novel catalyst system.

The inventors formerly discovered that the selectivity for formation of conjugated diolefines of the solid phosphoric acid catalyst is efficiently enhanced by calcination at a high temperature above 700° C. and now, as a result of further progression of investigations, the present invention has been accomplished.

The invention consists in the method of preparing conjugated diolefines which is characterized by catalytically decomposing a mono- or dialkyl-metadioxane using a solid phosphoric acid catalyst which has been subjected to heat treatment at a temperature above 700° C. for a period of at least 5 hours, then treated with cold or boiling water to extract water soluble substances therefrom and dried at a temperature below 1100° C.

The calcination of the catalyst to be used in the process of the invention may be conducted in an atmosphere of oxygen, nitrogen or air. The calcination time is at least 5 hours, preferably at least 7 hours. The catalyst which has been prepared under such conditions as set forth above is completely different in chemical structures from conventional solid phosphoric acid catalysts so that it is now difficult to refer the catalyst as a solid phosphoric acid catalyst. It is a white, opaque water-insoluble substance. The catalyst is conveniently used, as it is a very rigid substance, in moving bed process and fluidized bed process as well as in fixed bed process, and it does not cause any corrosion of reaction vessels because it is completely free from water soluble substances.

The catalyst of the invention is substantially free from orthophosphoric and meta phosphoric acids, so that in catalytic decomposition of metadioxanes using the catalyst polymerization of the resultant diolefins does not occur. Thus the catalyst makes it possible to obtain conjugated diolefines at a stable reaction rate and at a good selectivity. The catalytic decomposition preferably is conducted at a temperature of 180–230° C.

The monoalkylmetadioxane to which the present invention is applicable includes, for example, 4-methyl-metadioxane and 4-ethyl-metadioxane, and the dialkyl-metadioxane includes, for example, 4,4-dimethyl-metadioxane, 4,5-dimethyl-metadioxane and 4,4-diethyl-metadioxane.

Example 1

A solid phosphoric acid catalyst was, after heat treatment in air at 1070° C. for 16 hours, subjected to extraction with boiling water for 20 hours to eliminate therefrom acidic substances and dried at 1000° C. for 1 hour. Using 10 ml. of the catalyst thus obtained, catalytic decomposition of 4,4-dimethyl-metadioxane was conducted at a reaction temperature of 230° C. The reaction was continued for 100 minutes with feeding reactants in the form of a mixed gas at a rate of 12 cc. of the metadioxane, 18 cc. of water and 1 litre of nitrogen per hour. The conversion of the metadioxane was 73.3% and the selectivity of the catalyst for formulation of isoprene was 92.1%. For comparison, a solid phosphoric acid was calcined at 1030° C. for 3 hours and then, without any extraction with water, directly used as catalyst for decomposition of the metadioxane. In this case, the conversion of the metadioxane was 67.8% and the selectivity for formation of isoprene was 70.5%.

Example 2

Catalytic decomposition of 4,4-dimethyl-metadioxane was conducted at 220° C. by using a catalyst prepared by calcining a solid phosphoric acid catalyst in air at 1000° C. by varying the calcining time as indicated in the following table and extracting with water. The reaction was conducted with feeding the reactants in the form of a mixed gas at a feed rate of 14 cc. of the metadioxane, 20 cc. of water and 1 litre of nitrogen. The results obtained are summarized in the following table.

| Run | Calcination time, hours | Conversion of metadioxane | Selectivity for formation of isoprene, percent |
|---|---|---|---|
| 1 | 3 | 65.3 | 70.2 |
| 2 | 5 | 67.8 | 87.2 |
| 3 | 7 | 70.4 | 90.5 |
| 4 | 13 | 71.6 | 91.4 |
| 5 | 36 | 72.3 | 91.3 |

What we claim is:
1. A method for preparing conjugated diolefins which comprises decomposing a member of the group consisting of monoalkyl and dialkyl substituted metadioxanes at elevated temperatures in the presence of a catalyst which has been prepared by calcining a solid phosphoric acid catalyst consisting essentially of phosphoric acid on silica carrier at a temperature above 700° C. for at least 5 hours, extracting the calcined catalyst with water to remove water-soluble substances therefrom and then dry- ing the extracted catalyst at a temperature below 1100° C.

2. A process according to claim 1 in which the metadioxane is 4,4-dimethyl-metadioxane.

3. A process according to claim 2 in which the catalyst is calcined at a temperature of 1000° C.

4. A process according to claim 2 in which the decomposition of the metadioxane is effected at a temperature of 220° C.

References Cited by the Examiner

UNITED STATES PATENTS 3,060,239  10/1962  Hellin et al. _____ 260—681
3,221,075  11/1965  Hamamoto et al. ____ 260—681

DELBERT E. GANTZ, *Primary Examiner.*

G. E. SCHMITKONS, *Assistant Examiner.*